United States Patent
Van Den Heuvel et al.

(10) Patent No.: US 11,791,734 B2
(45) Date of Patent: Oct. 17, 2023

(54) PARALLEL BIDIRECTIONAL FLYBACK CONVERTERS WITH VALLEY SWITCHING

(71) Applicant: Power Research Electronics B.V., Breda (NL)

(72) Inventors: Mike Van Den Heuvel, Tilburg (NL); Jacobes Harmen Schijffelen, Breda (NL); Gautham Ram Chandra Mouli, Delft (NL); Dolf Henricus Jozef Van Casteren, Megen (NL)

(73) Assignee: Power Research Electronics B.V., Breda (NL)

( * ) Notice: Subject to any disclaimer, the term of this patent is extended or adjusted under 35 U.S.C. 154(b) by 258 days.

(21) Appl. No.: 17/420,754

(22) PCT Filed: Jan. 27, 2020

(86) PCT No.: PCT/EP2020/051929
§ 371 (c)(1),
(2) Date: Jul. 6, 2021

(87) PCT Pub. No.: WO2020/164895
PCT Pub. Date: Aug. 20, 2020

(65) Prior Publication Data
US 2022/0069720 A1 Mar. 3, 2022

(30) Foreign Application Priority Data

Feb. 14, 2019 (EP) .................................. 19157304

(51) Int. Cl.
*H02M 3/335* (2006.01)
*H02M 1/00* (2006.01)

(52) U.S. Cl.
CPC ..... *H02M 3/33584* (2013.01); *H02M 1/0043* (2021.05)

(58) Field of Classification Search
CPC ............................................... H02M 3/335–42
See application file for complete search history.

(56) References Cited

U.S. PATENT DOCUMENTS

| 7,046,525 | B2 | 5/2006 | Smidt et al. |
| 2008/0304292 | A1 | 12/2008 | Zeng et al. |
| 2019/0326825 | A1* | 10/2019 | Wang .................... H02J 7/0071 |

OTHER PUBLICATIONS

Thummala, Prasanth et al, Bidirectonal Flyback Converter with Multiple Series Connected Outputs for High Voltage Capacitive Charge and Discharge Applications, IEEE, Mar. 15, 2015, pp. 50-56.

(Continued)

*Primary Examiner* — Peter M Novak
(74) *Attorney, Agent, or Firm* — Richard M. Goldberg

(57) ABSTRACT

A bidirectional power converter includes flyback converter units connected in parallel, each having a controller and adapted to accumulate power from a primary side during an ON time and to deliver the accumulated power to a secondary side during an OFF time, the primary and secondary sides being interchangeable as to the direction of power conversion, the controller operating at a boundary between discontinuous and continuous conduction modes and performing valley switching when switching from OFF to ON, one converter unit operating as a master wherein the controller is adapted to control the length of ON time in order to feedback-control an overall current output of the converter, and each other converter unit operating as a slave wherein the controller controls the length of ON time in order to feedback-control a phase delay of ON time of the slave relative to ON time of another converter unit.

17 Claims, 7 Drawing Sheets

(56) References Cited

OTHER PUBLICATIONS

Ravi, Vaishnavi et al, Design and Implementation of Bipolar Bidirectional High Voltage Flyback Converter for Capacitive Loads, IEEE, Jun. 25, 2018, pp. 1-7.

* cited by examiner

PARALLEL BIDIRECTIONAL FLYBACK CONVERTERS WITH VALLEY SWITCHING

BACKGROUND OF THE INVENTION

The invention relates to a bidirectional power converter comprising a number of flyback converter units connected in parallel, each converter unit having a controller and being adapted to accumulate power from a primary side during an ON time of the unit and to deliver the accumulated power to a secondary side during an OFF time, the primary and secondary sides being interchangeable in accordance with the direction of power conversion, the controller being configured to operate at a boundary between a discontinuous conduction mode and a continuous conduction mode and to perform valley switching when switching from OFF to ON.

A power converter of this type may be employed for example for charging a battery of an electric vehicle and then offers the possibility to feed energy from the battery back into the grid in order to, for example, stabilize the public grid.

An example of a bidirectional flyback converter for high-power applications has been described in U.S. Pat. No. 7,046,525 B2. The flyback topology has advantages in terms of complexity, modularity and controllability of the controller.

As is well known in the art, flyback converter has a transformer with a primary winding and a secondary winding and electronically controlled switches in the primary and/or secondary circuits of the transformer. During the ON time, the switch in the primary circuit is closed so that the primary current may ramp up in the primary winding, with the result that magnetic energy is stored in the transformer. Then, during the OFF time, the switch in the primary circuit may be turned OFF while the switch (or a parallel diode thereof) on the secondary side are conductive, so that the energy that has been accumulated during the ON time may be delivered to an output terminal on the secondary side.

Typically, due to a diode behavior of the switch on the secondary side a current in the secondary winding of the transformer is allowed to flow as soon as the primary side switch is opened, and the current on the secondary side will then gradually decrease to zero while the magnetic field in the transformer decays. When the current on the secondary side has reached zero, a diode (or the switch) in the secondary circuit prevents the current from becoming negative, and the capacitances in the circuit, including parasitic capacitances of the transformer windings, in cooperation with the inductance of the windings, cause a gradually decaying voltage oscillation across the switch which is also reflected to the primary side of the transformer.

In a discontinuous current mode of operation (DCM), the time when the secondary to current reaches zero and the time when the switch on the primary side is closed again are separated by a time gap during which there is neither a primary current nor a secondary current in the transformer. In contrast, in a continuous current mode (CCM), the time periods when the switch on the secondary side is closed are complementary to the ON times during which the switch on the primary side is closed, so that a current is allowed to flow in at least one of the primary and secondary windings of the transformer at any time.

In order to minimize switching losses, it is advantageous to operate the converter right at the boundary between DCM and CCM and to perform so-called valley switching when switching the primary side switch from OFF to ON. Valley switching means that the primary side switch is closed at a time when the oscillating voltage across that switch has a minimum, so that the energy stored in the output capacitance of the switch at the time when the switch is closed is relatively small. Under certain conditions, the voltage drop across the primary side switch may even reach zero at the deepest point of the "valley", so that a zero voltage switching (ZVS) operation may be achieved which is particularly efficient in terms of switching losses (soft switching). Further, since the switch is operated at the boundary between DCM and CCM, this results also in zero current switching when the switch is closed. Valley switching results in variable switching frequency operation, where the switching frequency decreases as the output power increases.

In high-power applications, it is generally possible to operate several converters of the type described above in parallel. It is beneficial to operate the units in parallel in an interleaved fashion as interleaving reduces the input and output voltage ripple and the necessary passive filters required. In that case, however, it is difficult to coordinate the operations of the several converter units such that ripple on the voltage on the secondary side can be limited and EMC requirements can be met. This is because interleaved operation requires the maintenance of a constant time shift between the parallel units given by $1/(fn)$ where n is the number of parallel units and f is frequency of the switches. In case of valley switching, the switching frequency is continuously changing with the output power and hence it becomes challenging to keep the phases interleaved under variable load.

SUMMARY OF THE INVENTION

It is therefore an objective of the invention to provide a power converter of the type indicated above which can be realized at relatively low costs, is suitable for high-power applications and can be operated with high efficiency and with reduced electromagnetic noise.

In order to achieve this objective, the power converter according to the invention is characterized in that one of the converter units is configured to operate as a master wherein the controller is adapted to control the length of the ON time in order to feedback-control an overall current output of the converter, and each of the other converter units is configured to operate as a slave wherein the controller is adapted to control the length of the ON time in order to feedback-control a phase delay of the ON time of the slave relative to the ON time of another one of the converter units.

The converter according to the invention can easily be scaled up for higher-power applications by adding a suitable number of slaves. Cost reductions can be achieved because all slaves can have an identical design and even the basic design of the master may be identical with that of the slaves, except for minor modifications in the control mode.

By feedback-controlling the phase delays in the ON times of the slaves, it is possible to achieve, in spite of necessary variations in the switching frequency, a stable interleaved operation in which the ON times of the various converter units are staggered such that the ripple voltages produced by the converter units almost cancel each other, so that that the overall ripple is reduced significantly.

In the master, the length of the ON time determines the output power and can therefore be used for feedback-controlling the overall output current on the secondary side of the converter. When the ON time is increased, the decay time of the secondary current will increase in proportion, and since the zero-current condition for the secondary current triggers the next ON cycle on the primary side, changes in the ON time lead to corresponding changes in the switching frequency of the converter. In the slaves, since the ON time of the slaves is used to feedback-control the phase delays, the switching frequencies of the slaves are automatically locked into the switching frequency of the master, which has the effect that not only the phase relations between the converter units remain stable but also that the ON times of the slaves are locked to the ON time of the master, so that all converter units will automatically have approximately equal power conversion rates.

More specific optional features of the invention are indicated in the dependent claims.

The electronic switches (e.g. MOSFETs) on the primary and secondary sides of the converter units may be based on silicon carbide (SiC) or gallium nitride (GaN) semiconductors which can cope with high temperatures, high voltages and high power densities. The electronic switches are preferred to have an anti-parallel diode or to facilitate two way current flow for the converter to be bidirectional.

The control operations for feedback-controlling the current in the master and controlling the phase delays in the slaves may be performed cycle-by-cycle, which enables a quick response to any changes in the external conditions as well as a short tune-in period at power start-up of the converter.

In one embodiment, target values for the ON times may be represented by analog voltage signals. The actual switching timings may then easily be determined by comparing the voltage signal to a ramp voltage that ramps-up with a known rate.

When it is detected in a slave controller that the phase delay of the ON time deviates from the target value, the analog voltage that represents the target ON time may be changed by a suitable amount. It may be preferred to limit the time rate of change with which the target value for the ON time is changed or, equivalently, to limit the amount by which the target value is corrected in each switching cycle. This can avoid for example a situation in which the correction of the length of the ON time and the resulting change in the phase delay become so large that a switching cycle is skipped entirely.

If the number of converter units is three or more, it would in principle be possible to cascade the slaves, so that, for example, slave 1 would be the master of slave 2, slave 2 would be the master of slave 3, and so on. It may be preferred however that there is only one master to which all the slaves respond directly.

It may also be preferred to assure in the slave controllers that the length of the ON time of the slave can deviate from the length of the ON time of the master only within certain limits, so that the power conversion rates will remain balanced. This may somewhat delay the time that is required for correcting an error in a phase delay, but since the changes in the phase delay will accumulate from cycle to cycle and the overall switching frequency is high (typically in the order of magnitude of 40-300 kHz), the correction of errors is achieved sufficiently fast.

In order to minimize the switching losses, zero voltage switching (ZVS) would be most desirable in any mode of operation. However, ZVS is possible only on condition that the DC voltage on the primary side is not larger than the DC voltage on the secondary side, and this requirement can be fulfilled only for one of the two conversion directions for a given input and output voltage. Consequently, for the reverse direction, valley switching (LVS) is all that can be achieved. Thus, if ZVS occurs for a power flow from a first side to a second side, then LVS occurs for the power flow from the second side to the first side and vice versa.

It is possible to come close to the ideal conditions (ZVS in one direction and almost ZVS in the reverse direction) if the DC voltages on the primary side and the secondary side are essentially equal. However, in many practical applications, the voltages on the primary and secondary sides will be significantly different from each other. For example, in case of a battery charger for electric vehicles, the voltage of the battery will typically be in the range from 200 to 500 V, depending on the state of charge (SoC) of the battery, whereas the rectified (three-phase or single phase) grid voltage on the grid side will be as high as 750 V. It is therefore convenient to split the grid side of each converter into two sub-units and thereby to divide the grid voltage into two voltage fractions of 375 V each. As a consequence, each voltage fraction will be approximately equal to the average voltage on the battery side so that the optimal conditions for ZVS/LVS are met at least approximately.

At the same time, this split architecture has the advantage that the peaks of the oscillating voltages at the switches can be kept below 1200 V (in case of a three-phase 400 V grid voltage) or below 600 V (in case of a single-phase 230 V grid voltage). This is important because most commercially available and relatively cheap electronic components can tolerate peak voltage up to these limits, so that the use of expensive special purpose components can be avoided.

The split architecture of the converter units may be advantageous independently of whether or not the master-slave architecture according to the claims is employed. Thus, the present application also discloses a power conversion system comprising the bidirectional power converter according to the preamble of the claims connected between a first pair of DC voltage terminals and a second pair of DC voltages, the bidirectional power converter having a number of transformers each having a first winding on the side of the first DC voltage terminals and a second winding on the side of the second DC voltage terminals, wherein at least one of the first and second windings of each transformer is split into a number $N \geq 2$ of sub-windings, each sub-winding forms part of a converter sub-unit having a pair of input/output terminals, the input/output terminals of the sub-units are connected in series between the corresponding pair of DC voltage terminals, thereby to divide the voltage across these DC voltage terminals into N voltage fractions, and the number N is selected such that the voltages and voltage fractions, respectively, of the voltages across the first and second DC voltage terminals differ by no more than +/−20%.

In a preferred embodiment of this power conversion system, the peak voltages occurring across the switches of the converter units and sub-units during operation of the power conversion system are smaller than 1200 V (in case of a three-phase grid voltage) or smaller than 600 V (in case of a single-phase grid voltage).

The number of turns of each sub-winding of each transformer may be equal to the number of turns of the first winding of that transformer. This has the advantage that a good magnetic coupling between the first and secondary windings may be achieved and the internal losses of the transformer are low. Optionally, however, the number of turns of each sub-winding may be varied so as to differ from the number of turns of the primary winding. As a consequence, the voltage ratio between the primary voltage and the secondary voltage at each sub-winding may differ from 1:1. This freedom of choice may be utilized for fine-tuning the relation between the voltages on the first and second sides of the converter so as to further optimize the conditions for ZVS/LVS and/or for limiting the peak voltages.

BRIEF DESCRIPTION OF THE DRAWINGS

An embodiment example will now be described in conjunction with the drawings, wherein.

DETAILED DESCRIPTION

Figure 1:
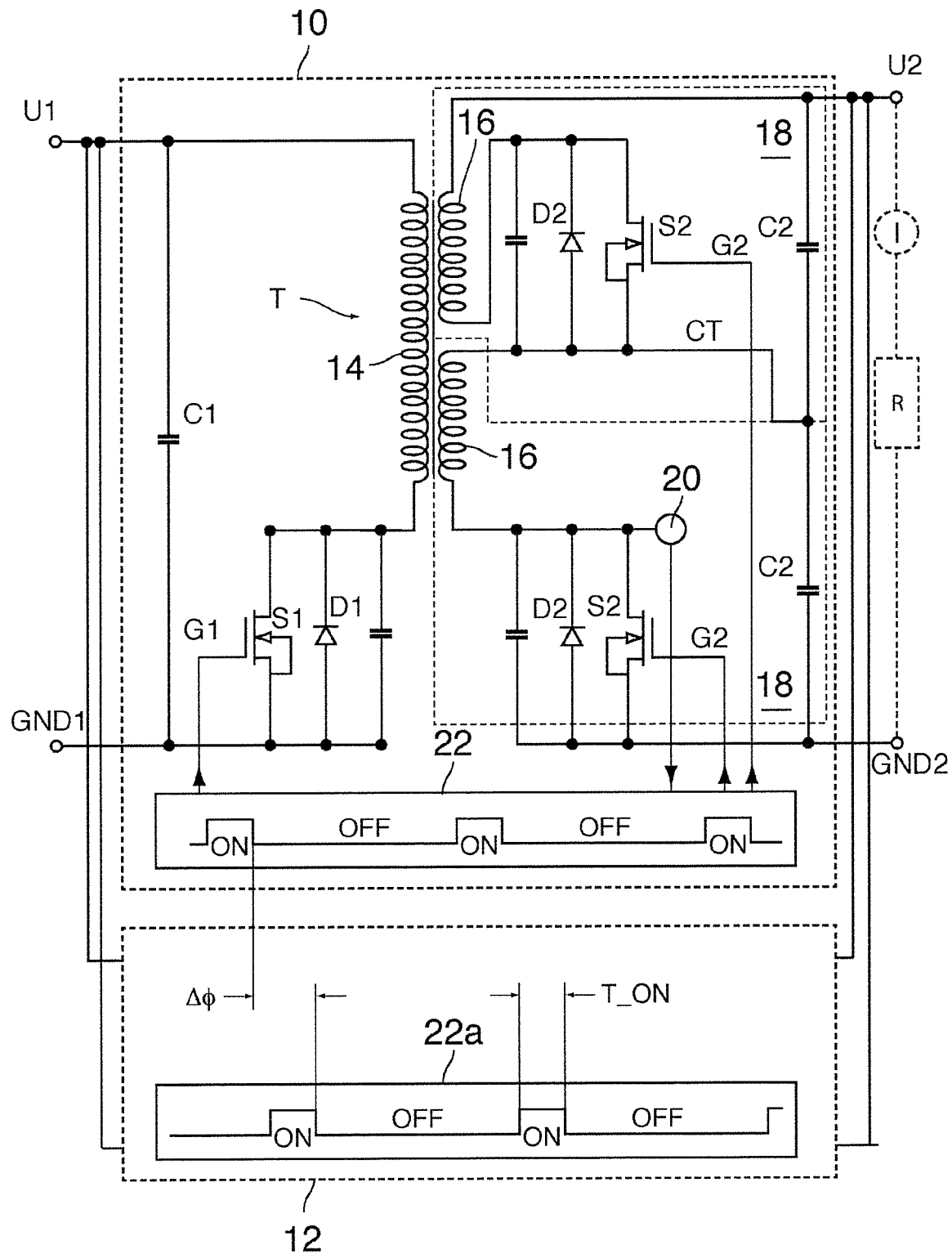
FIG. 1 is a circuit diagram of a bidirectional power converter according to the invention.

A bidirectional power converter according to an embodiment example of the invention has four converter units 10, 12, only two of which have been shown in FIG. 1, for simplicity. The converter units 10, 12 are connected in parallel between first pair of DC voltage terminals U1, GND1 and a second pair of DC voltages terminals U2, GND2. Each of the converter units 10, 12 is a bidirectional flyback converter. A simplified circuit diagram of the flyback converter has been shown for the converter unit 10.

As is well known in the art, the flyback converter has a transformer T with a first winding 14 and a second winding which, in this example, is split into two sub-windings 16. By way of example, it shall be assumed that the converter is operating in a mode in which power is transferred from the side of the first pair of voltage terminals U1, GND1 to the side of the second DC voltage terminals U2, GND1, so that the first winding 14 is the primary winding and the second winding is the secondary winding. The first winding 14 and a first switch S1 are connected in series between the first DC voltage terminals U1, GND1, and a capacitor C1 is connected directly between these two terminals. As has been symbolized by a diode D1 and a capacitor (no reference sign) connected in parallel to the switch S1, the switch behaves like a diode in the open (non-conducting) state and has a certain internal capacitance. Optionally, snubber capacitors may be provided in parallel to the switch. An extra diode can be connected across the switch if the internal diode of the switch does not have an adequately good performance. Further, extra capacitance can be connected across the switch for valley switching operation if required.

Each sub-winding 16 on the secondary side forms part of a converter sub-unit 18 that is a mirror image of the circuit on the primary side that has just been described. Thus, each converter sub-unit 18 has a switch S2 (and a diode D2) connected in series with one of the sub-windings 16, and a capacitor C2 connected in parallel with the series connection of the sub-winding and the switch. The DC voltage terminal U2 is connected to the free terminal of one of the sub-windings 16 (the terminal that is not connected to the switch S2). The terminal GND2 is connected to the free terminal of the switch S2 of the other converter sub-unit. The capacitors C2 of the two converter sub-units 18 are connected in series between the terminals U2 and GND2, and their center point CT is connected to the remaining free terminals of the switch S2 of the upper converter sub-unit 18 in FIG. 1 and the remaining free terminal of the sub-winding 16 of the other converter sub-unit. The terminals of the capacitor C2 of each converter sub-unit 18 constitute an output of that converter sub-unit, and the output voltages of the two converter sub-units add up to the voltage across the pair of terminals U2, GND2.

In operation, the switch S1 is closed for a certain ON time, so that a current builds up in the first winding 14 and increases approximately linearly until the switch S1 is opened again. During this ON time, magnetic energy is stored in the transformer T. Then, when the switch S1 is opened, the magnetic field in the transformer induces a gradually decreasing current in each of the sub-windings 16, thereby charging the capacitors C2 and feeding power to the output.

A zero current detector 20 at one of the converter sub-units 18 (the lower one in FIG. 1) detects the time when the current in the winding 14 and the sub-windings 16 has decreased to zero, and a valley in the voltage across the switch S1 is detected subsequently. At that time, the switches S2 are opened again, and the switch S1 may be closed again so as to start another switching cycle consisting of an ON time and an OFF time of the switch S1.

An electronic controller 22 of the converter unit 10 provides a gate signal G1 to the switch S1, thereby to control the ON and OFF times of that switch. Similarly, the controller 22 provides gate signals G2 to the switches S2.

In case of the converter unit 12, only a controller 22a has been shown. The circuit design of that converter unit 12 is the same as that of the converter unit 10. In the blocks representing the two controllers 22, 22a, waveforms have been shown which represent the ON and OFF times of the respective converter unit. As has been shown symbolically in FIG. 1, the converter unit 12 is controlled such that there is a certain phase delay $\Delta\phi$ between the ON times of the two converter units. If a phase angle of 360° is considered to represent the complete switching cycle of the converter unit, then the phase delay $\Delta\phi$ of the converter unit 12 shown in FIG. 1 is 90°. For the two other converter units that have not been shown in FIG. 1, the phase delays are 180° and 270°, respectively, so that the states of operation of the four converter units are interleaved with even phase delays.

Since the power converter is bidirectional, the converter units 10, 12 have also a mode of operation in which the side of the terminals U2, GND2 is the primary side. In that mode, the detection circuit 20 performs zero current detection for the winding 14. Thus, only a single detection circuit 20 per converter unit is needed.

Figure 2A:
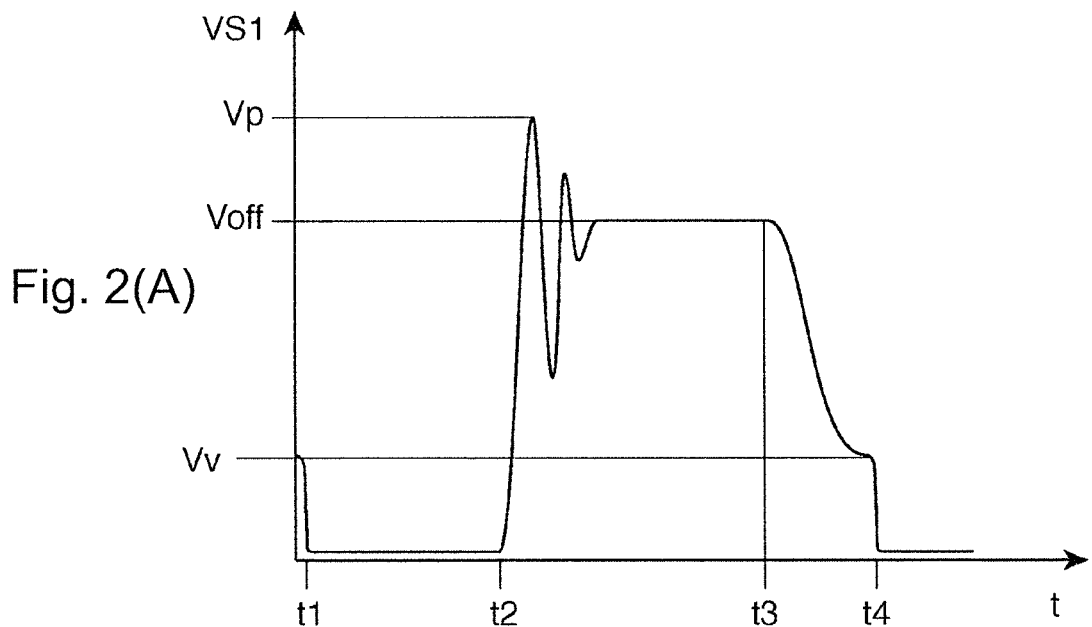
FIGS. 2(A)-2(C) show waveforms of voltage and current signals occurring in the converter shown in FIG. 1.
Figure 2B:
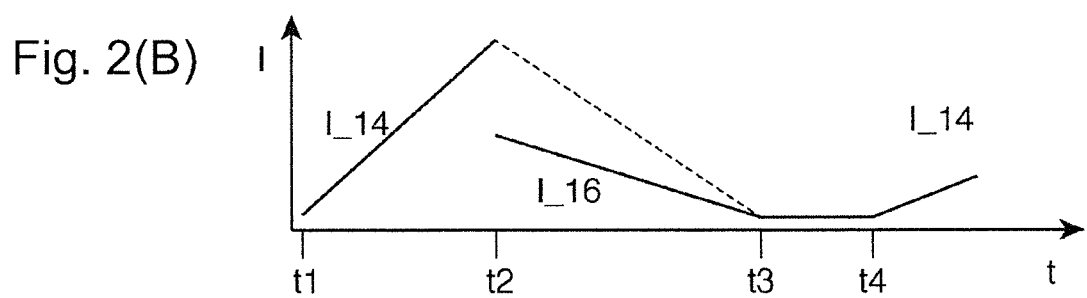
Figure 2C:
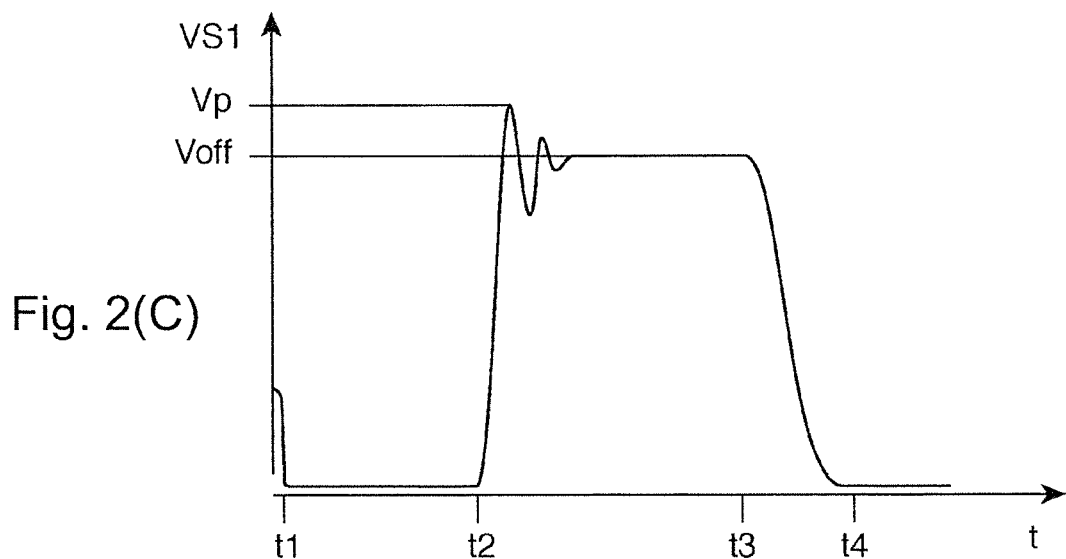

FIG. 2 (A) shows a waveform of a voltage across the switch S1, namely VS1, over an entire switching cycle that lasts from a time t=t1 to a time t4. An ON time starts at t1 with closing of the switch S1. Consequently, the voltage VS1 drops to close to zero and remains there until the switch is opened again at a time t2.

FIG. 2 (B) illustrates the rise of a current I_14 in the first winding 14 during that time interval.

When the switch S1 is opened at t2, the voltage VS1 rises abruptly to a value Voff=V1+V2/2 (in the case of one primary winding and two secondary windings), wherein V1 is the voltage at the terminal U1 and V2 is the voltage at the terminal U2. However, due to capacitances and inductances that are present in the circuit and due to imperfect coupling between the windings 14 and 16, the initial voltage rise shoots-over and reaches a peak voltage Vp. Then, the voltage approaches the value Voff in a decaying oscillation and then remains at that value.

As is shown in FIG. 2(B), when the switch S1 has been opened, the diodes D2 are conductive and a current I_16 is flowing in each of the sub-windings 16 of the transformer. This current is driven by the energy stored in the magnetic field of the transformer and decreases while the magnetic field collapses. When the switches S2 are closed, parallel currents may flow through each switch S1 and the associated diode D2.

If there are two sub-windings 16 as in FIG. 1, I_16 is one half of I_14 as has been shown in continuous lines in FIG. 2(B). The case with only one second winding has been illustrated in dashed lines. The current on the secondary side reaches zero at a time t3, and this event is detected by the detection circuit 20. Since the switches S2 have a diode behavior and prevent the current in the sub-windings 16 from becoming negative, all the capacitances in the circuit forming the converter sub-unit 18 interact with the inductance of the transformer T and produce a voltage oscillation the amplitude of which is dependent upon the voltage drop across the capacitors C2. Due to the transformer T, this voltage oscillation is reflected also to the primary side, and therefore a corresponding oscillation appears also in the waveform in FIG. 2 (A) in a time interval between t3 and t4. Due to this oscillation, the voltage VS1 reaches a minimum at t4. The length of the time interval between t3 and t4 depends upon the capacitances and inductance in the circuit and is known. At the instant t4, when the voltage drop VS1 across the switch S1 is in a "valley", the controller 22 closes the switch S1 again, so that the voltage drops to zero and a new ON time begins.

The strategy that consists in determining the deepest point in the waveform of the voltage VS1 and triggering the ON time when this voltage is in a "valley" is called "valley switching" and has the advantage that the switching losses at the switch S1 are minimized.

As will be understood from FIG. 2 (A) and (B), when the length of the ON time, i.e. the interval between t1 and t2 is increased, the current in the transformer will reach higher values and it will take more time until the current has returned to zero again at t3. Thus, the length of the ON time determines also the length of the entire switching cycle and, consequently, the switching frequency.

Moreover, the length of the ON time determines also the magnitude of power that is transferred from the left side to the right side in FIG. 1. More specifically, since the energy stored in the magnetic field of the transformer goes with the square of the current IT, the rate of power transfer increases with increasing ON time and with decreasing switching frequency. Consequently, when an ohmic load R (FIG. 1) is applied between the second DC voltage terminals U2, GND2, the current I flowing through that load can be controlled by controlling the ON time of the converter units.

If the voltage drop across the terminals U2, GND2 is designated as V2, then the waveform shown in FIG. 2 (A) applies to the case that V1>V2/2 (the voltage fraction V2/2 is the output voltage of a single converter sub-unit 18, i.e. the voltage across each of the capacitors C2). In that case, the valley voltage Vv is given by $$Vv = V1 - V2/2.$$

Consequently, if V1≤V2/2, then Vv becomes zero and low voltage switching LVS changes to zero voltage switching ZVS. The corresponding waveform has been shown in FIG. 2 (C). ZVS is ideal in terms of minimizing switching losses. Another advantage of a low voltage V1 is that the peak voltage Vp also becomes smaller.

When the power converter is operated in the reverse direction of power conversion, the switches S1 and S2 change their roles. Then, zero voltage switching is possible under the condition V2/2<V1.

As an example, it may be assumed that the converter shown in FIG. 1 is used for charging a battery of an electric vehicle, the battery being connected to the terminals U1 and GND1, and a rectified grid voltage (three phases) is applied at the terminals U2, GND2. Then, the battery voltage V1 will vary between 250 V and 450 V, for example, depending upon the state of charge (SoC) of the battery. In terms of lifetime of the battery, it is favorable to operate the battery at about 50% SoC, so that the average of V1 would be around 350 V. Then, when the battery is charged, the average of V1 (350 V) is smaller than V2/2 (375 V). The difference is only 25 V, so that low voltage switching is possible with a low valley voltage Vv of 25 V. When the battery gets charged and the battery voltage reaches 375 V and beyond, the favorable zero voltage switching (ZVS) becomes possible.

When the direction of power conversion is reversed and the battery is used for feeding power into the grid, favorable ZVS is possible most of the time, i.e. as long as the battery voltage is less than 375 V.

Obviously, this concept can be extended to applications where the difference between (average) V1 and V2 is even larger. For example, if V2 is three times V1, it would be convenient to split the winding of the transformer into three sub-windings. This would not only improve the conditions for ZVS but would also reduce the peak voltage Vp when the direction of power conversion is from right to left in FIG. 1.

The function of the converter units 12 is the same as that of the converter unit 10 as described above, with the only difference that the ON times have phase delays of 90° relative to one another.

Figure 3:
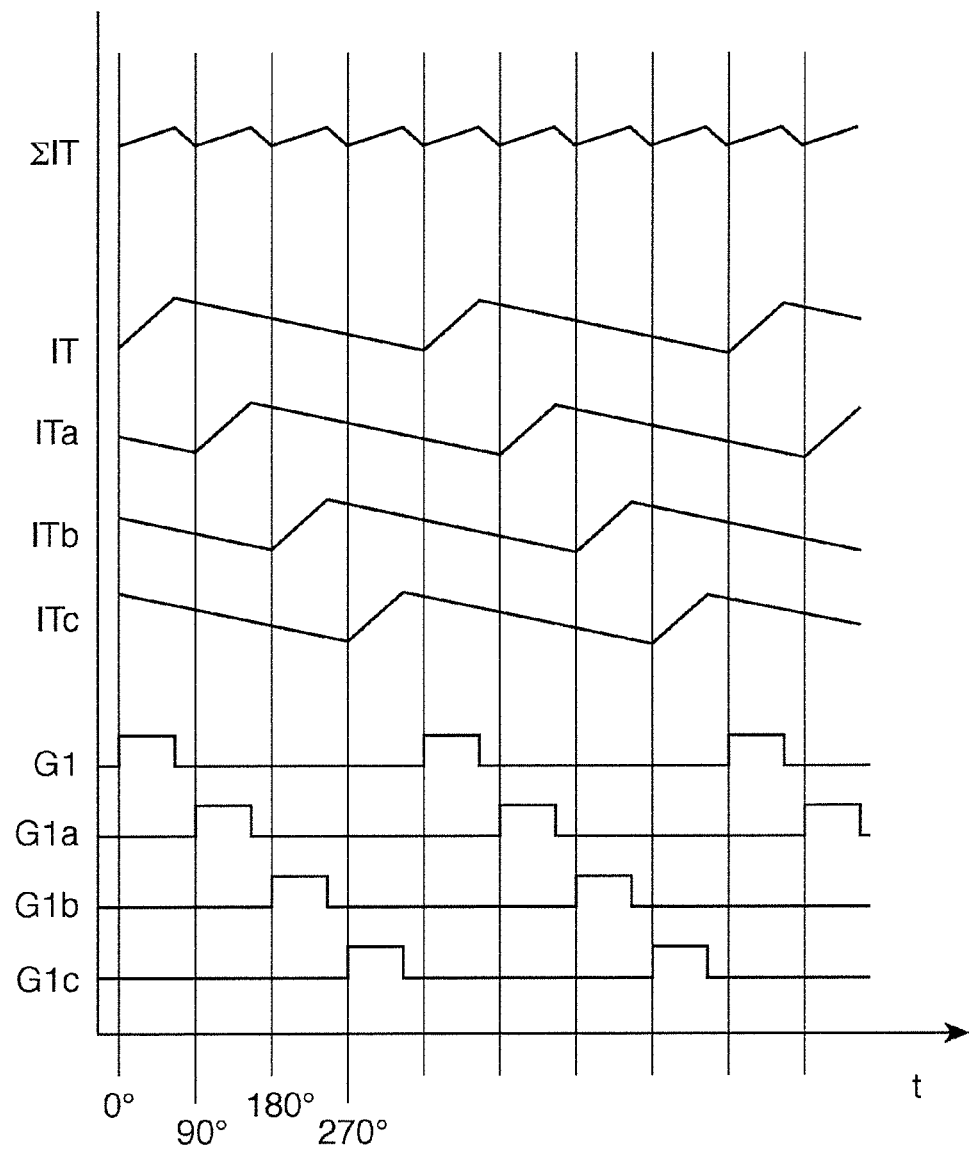
FIG. 3 is a time diagram showing ON times and output currents of a converter with four interleaved converter units.

FIG. 3 is a time chart showing, in the bottom part, the gate signal G1 for the switch S1 of the converter unit 10 as well as corresponding gate signals G1a, G1b and G1c for the switches S1 of the converter units 12. Each gate signal is high during the ON time of the converter unit. The phase delays of the ON times are clearly visible in this diagram. The upper part of FIG. 3 shows the resulting currents IT, ITa, ITb, ITc in the transformers of the converter units, and the topmost curve shows the sum ΣIT of these transformer currents, which sum corresponds to a ripple on the output voltage at the second DC terminals U2, GND2. It can be seen that the interleaved operation of the four converter units with evenly distributed phase delays results in an increase of the ripple frequency by a factor 4 and a significant decrease in the ripple amplitude.

The design and the function of the controllers 22, 22a for the converter units 10, 12 will now be described in conjunction with FIGS. 4 to 10, with a particular focus on the control functions for feedback-controlling the overall current output of the converter (current at the terminals U2, GND2 under ohmic load) and the functions for keeping the phase delays between the ON times stable.

Figure 4:
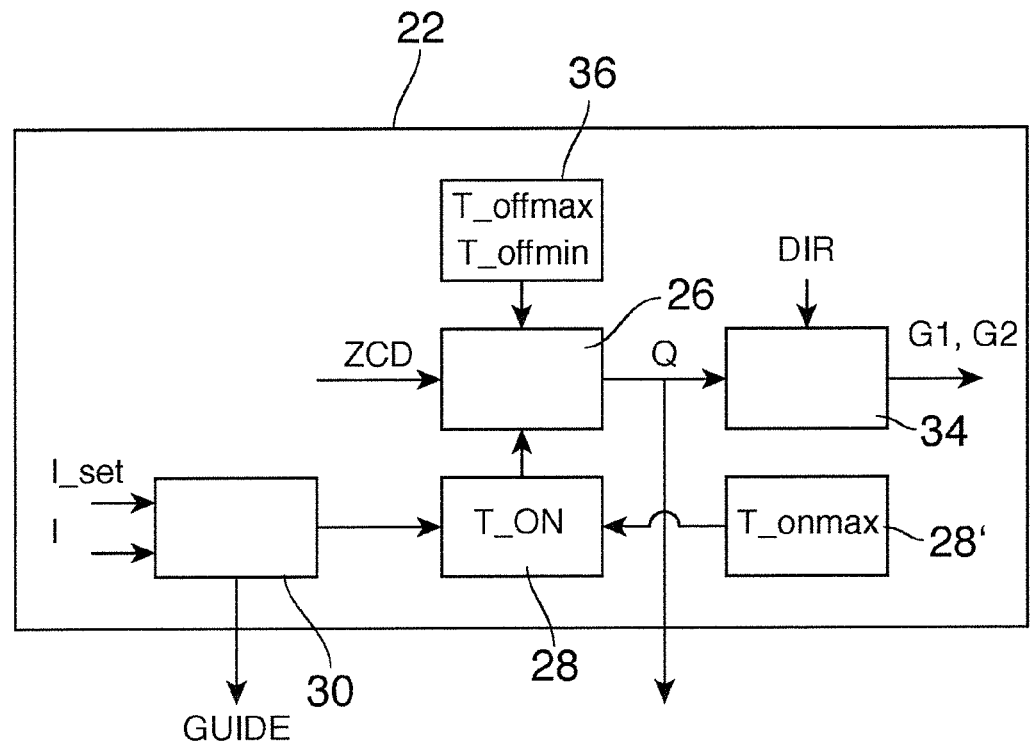
FIG. 4 is a block diagram of a controller of a master converter.

FIG. 4 is a simplified block diagram of the controller 22 of the converter unit 10. A first latch circuit 26 receives as input a pulse-like zero current detection signal ZCD from the detection circuit 20 of the converter unit 10. It will be understood the signal ZCD indicates the time t3 in FIG. 2 or FIG. 5, i.e. the time at which the transformer current I_16 has decreased to zero. This triggers a signal for opening the switches S2 on the output side, and it also triggers a timer (not shown) that counts the known delay time between the times t3 and t4, so as to determine the timing t4 for valley switching. As described before, this is the instant at which the switch S1 on the input side is closed. To that end, an output Q of the latch circuit 26 assumes a value of logic "1" at the time t4. This event triggers another timer for counting the length of the ON time on the basis of a voltage signal T_ON that is provided by a control block 28.

A current feedback controller 30 receives as inputs the measured output current I of the converter as well as a target value I_SET for that output current. The current feedback controller 30 compares the measured current I to the target value and increases T_ON when the actual current is below the target value and decreases T_ON when the actual current I is larger than the target value. A limiter 28' is provided for limiting T_ON to a maximum value T_onmax to ensure that the current through the switch S1 does not exceed a maximum current limit, so that the flyback converter can never saturate.

Figure 5:
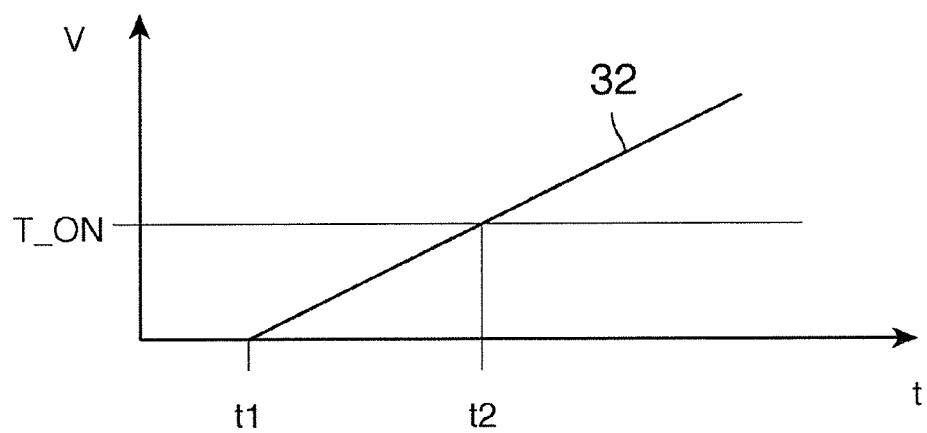
FIG. 5 is a time chart illustrating an operation of a timer

The function of the above-mentioned timer in the latch circuit 26 that determines the length of the ON time has been illustrated in FIG. 5. The time t1 (equivalent to t4), at which the ON time begins, has been determined on the basis of the signal ZCD. At that time, a ramp voltage 32 is created (e.g. by charging a capacitor) and the ramp voltage starts to increase linearly from zero at t4 with a constant slope. A comparator compares the ramp voltage 32 to the voltage signal T_ON that is received from the control block 28 and represents the length of the ON time. As soon as the ramp voltage 32 reaches T_ON, at the time t2, the output Q is switched to logic "0", which terminates the ON time.

A switching circuit 34 in the controller 22 (FIG. 4) forwards the output Q as the gate signal G1 to the switch S1.

In this way, the length of the ON time is increased or decreased in order to keep the output current I at the target value I_SET.

The switching circuit 34 receives as input a logic signal DIR that indicates the direction of power conversion. If this direction signal DIR indicates that the direction of power conversion has been reversed from the right side to the left side, the switching circuit 34 forwards the output signal Q as the gate signal G2 to the switches S2, so that a current between the DC terminals U1, GND1 on the left side in FIG. 1 is feedback-controlled on the basis the length of the ON times of the switches S2.

In the example shown, the controller 22 further includes a limiter 36 which provides voltage signals T_offmax and T_offmin to the latch circuit 26. T_offmax represents a maximum OFF time of the switch S1 or the switches S2 and thereby sets the minimum frequency of the flyback converter, and T_offmin represents a minimum OFF time. Normally, the OFF time is determined by the zero current detection signal ZCD. However, the limiter 36 assures that the OFF time will in no case be shorter than T_offmin and will in no case be larger than T_offmax. This limits the switching frequency range in which the converter unit can operate.

Since the controller 22 changes the ON time of the converter unit 10, it is clear that the switching frequency of that converter unit will not be constant. This raises the problem to appropriately control the phase delays of the ON times in other converter units 12.

In order to solve this problem, the converter unit 10 is operated as a master to which the controllers 22a of the other converter units 12 respond. In particular, the controller 22 provides its output signal Q to the controllers 22a of the slaves. Further, the voltage signal T_ON that represents the length of the ON time in the master is provided to the slaves as a guide signal "GUIDE".

Figure 6:
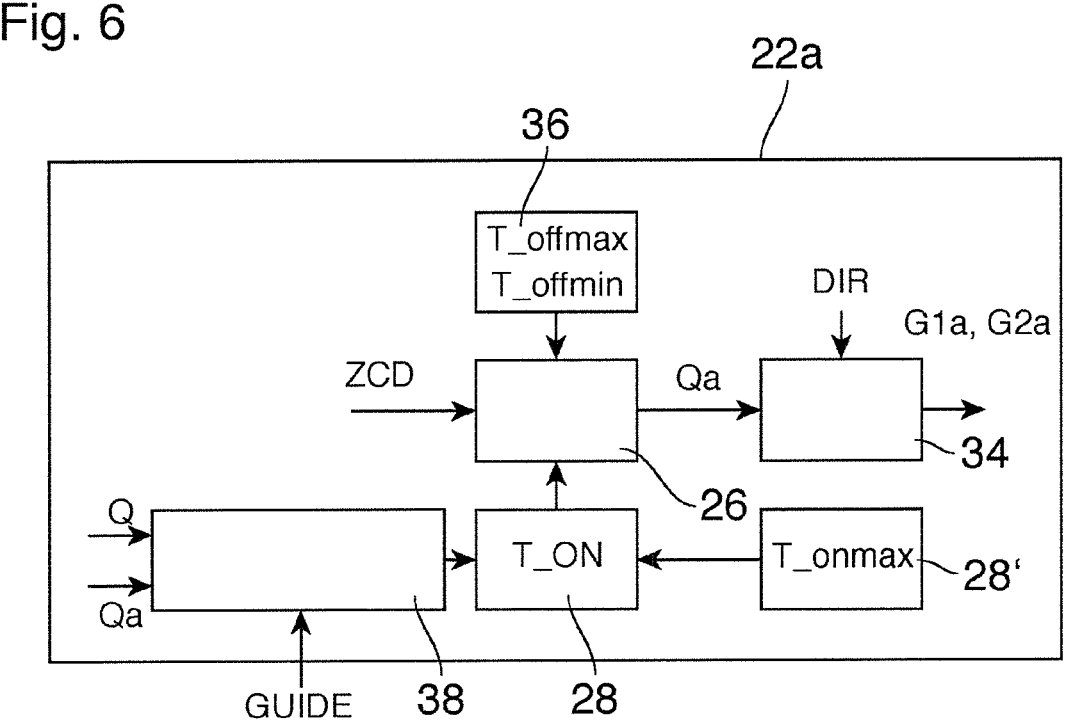
FIG. 6 is a block diagram of a controller of a slave converter.

FIG. 6 is a block diagram of the controller 22a of one of the slave converter units 12. The design of the controller 22a is identical with that of the controller 22 with the only difference that the current feedback controller 30 has been replaced by a phase feedback controller 38. Of course, in the controller 22a, the latch circuit 26 receives the zero current detection signal ZCD and from the detection circuit 20 of its own converter unit 12. The output of the latch circuit 26 is designated as Qa in this case, and the outputs of the switching circuit 34 are designated as G1a and G2a and are fed to the switches S1 and S2 of the converter unit 12.

The phase feedback controller 38 receives the output signal Q from the controller 22 of the master, the output signal Qa from its own latch circuit 26, and the guide signal GUIDE from the master and uses these signals to determine the length T_ON of the ON time.

Figure 7:
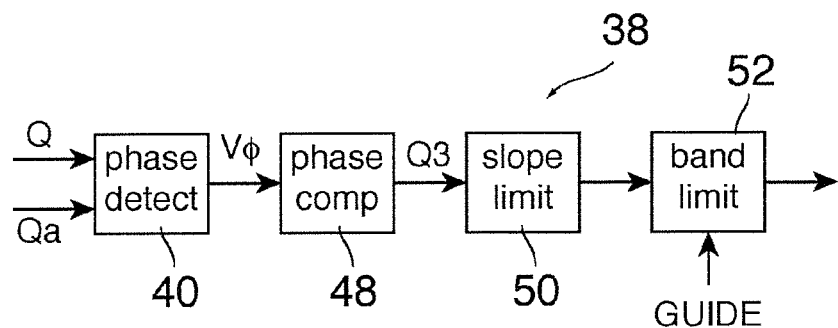
FIG. 7 is a detailed diagram of a phase delay regulator in the slave controller.
Figure 8:
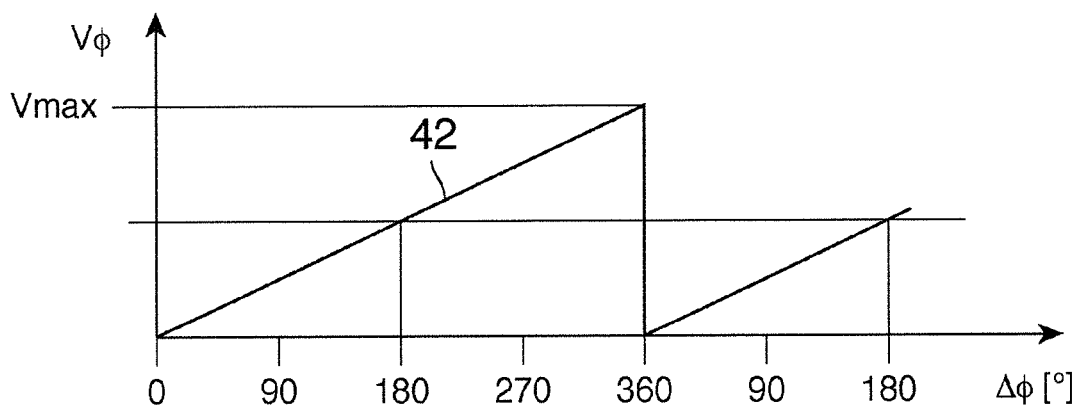
FIG. 8 is a diagram showing a characteristic of a phase detector.

Details of the phase feedback control circuit 38 have been shown in FIG. 7. A phase detector 40 receives the signals Q and Qa and generates an analog voltage signal 42, shown in FIG. 8, which increases linearly with the phase delay Δϕ of the slave converter unit 12 relative to the master converter unit 10. The voltage 42 reaches a maximum Vmax at a phase delay of 360° and is then reset to zero. In this way, each phase delay Δϕ between 0 and 360° is represented by a voltage Vϕ between zero and Vmax.

Figure 9:
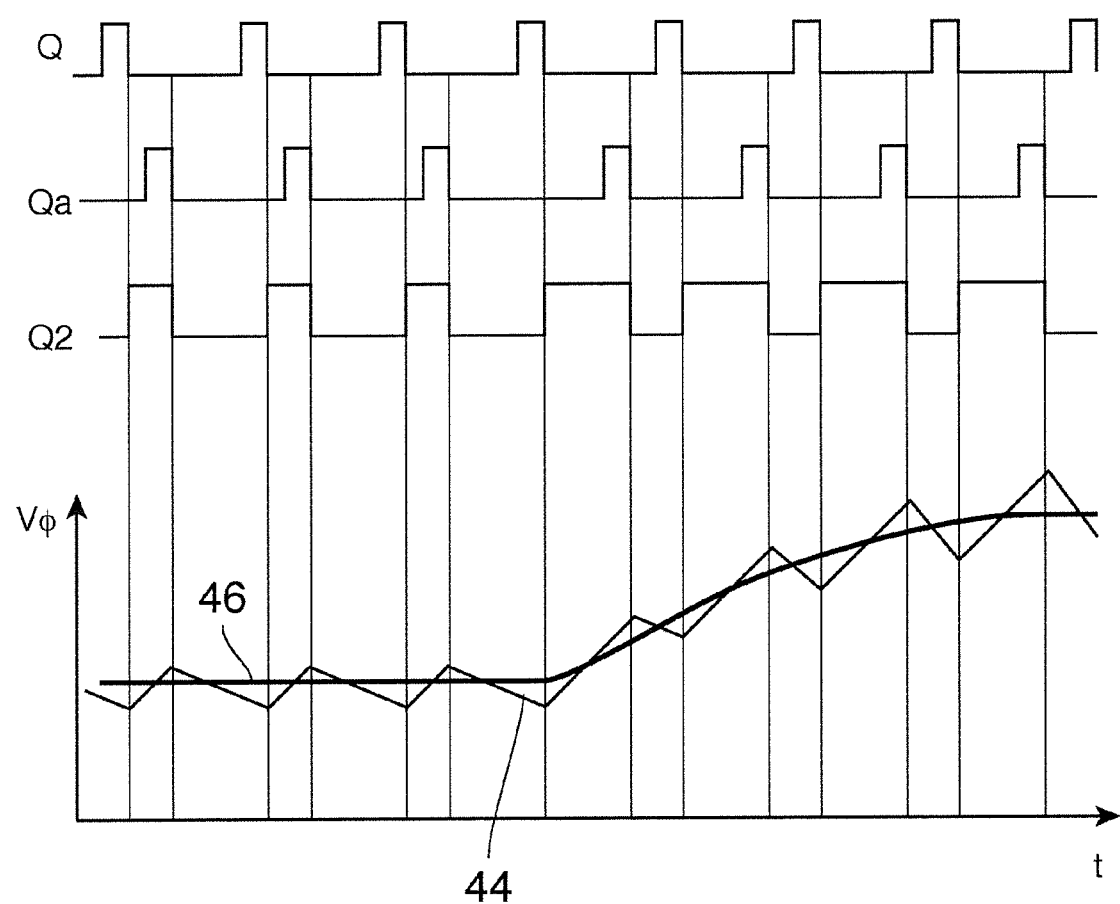
FIG. 9 is a time chart illustrating an operation of the phase detector.

A possible way to form the voltage Vϕ has been illustrated in FIG. 9. The topmost two waveforms in FIG. 9 are the signals Q and Qa which define the ON times in the converter units 10 and 12, respectively. It is assumed that the target phase delay between these ON times is 180°. In the example shown, the phase delay of Qa relative to Q is less than 180° for the first three periods, but in the later periods the phase delay is larger than 180°. The waveform Q2 in FIG. 9 is an output of a flipflop that is set at the falling edge of Q and reset at the falling edge of Qa, so that the pulse width is proportional to the phase delay. The signal Q2 is used to charge a capacitor that is permanently discharged via a fixed resistor, which results in a waveform of the voltage Vϕ as shown by the curve 44. Initially, the voltage Vϕ corresponds to an equilibrium state of the capacitor, and the average voltage represented by the curve 46 is constant. Then, as the phase delay increases, the capacitor is charged to a higher voltage.

However, with increasing voltage, the discharge current increases also, so that a new equilibrium is reached that represents the larger phase delay in the later switching cycles in FIG. 9.

Returning to FIG. 7, a phase comparator 48 compares the voltage Vϕ to the target phase delay which is 180° in this example. The phase comparator has an output Q3 which is positive when the voltage Vϕ is smaller than the target value and negative when the phase delay is larger than the target value. This has been illustrated in the two upper diagrams in FIG. 10.

Figure 10:
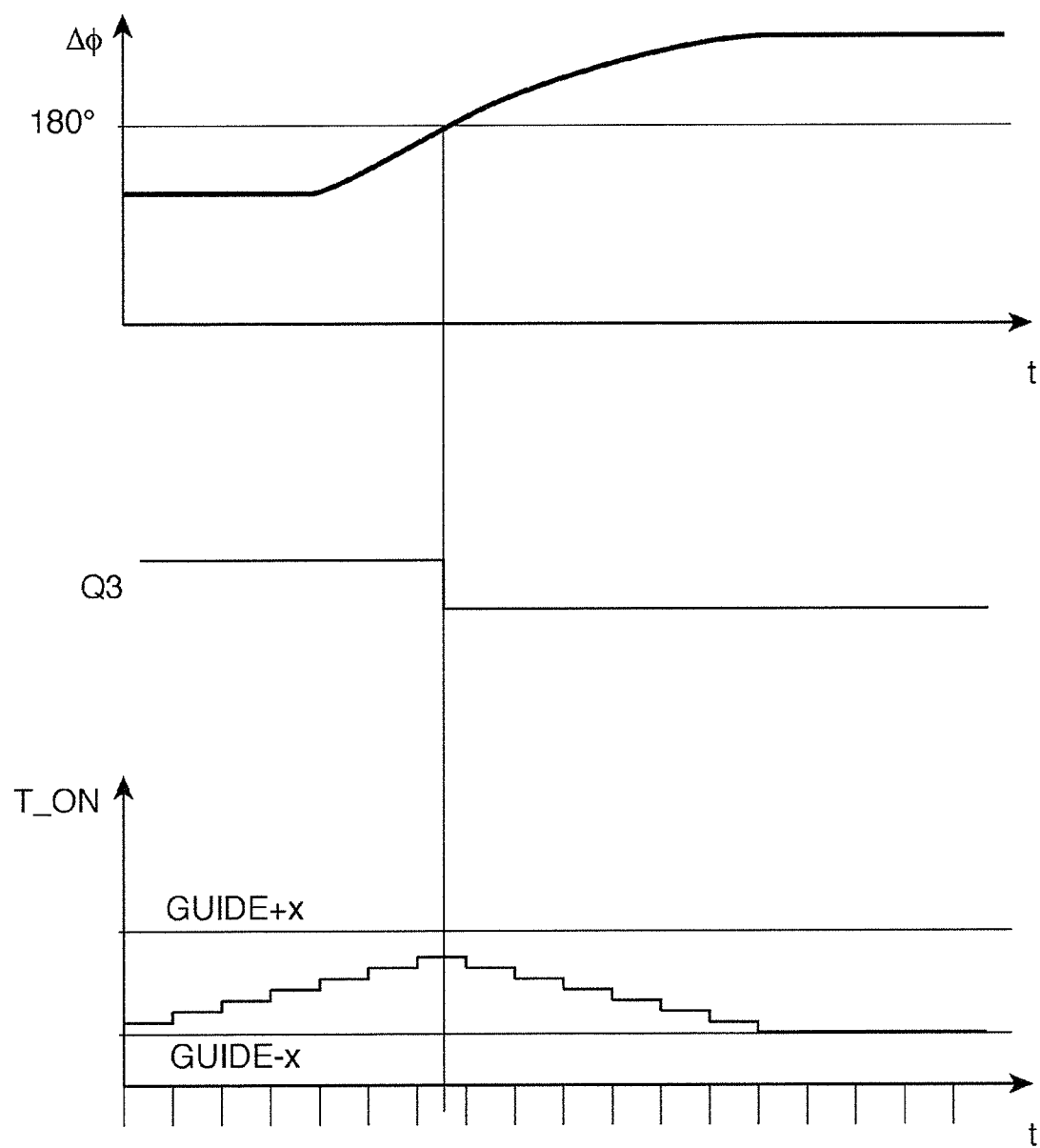
FIG. 10 is a time chart illustrating an operation of the phase delay regulator.

As is shown in FIG. 7 and in the lower part of FIG. 10, a slope limiter 50 samples the signal Q3 at a rate that depends upon the switching frequency and increases the voltage value T_ON that represents the length of the ON time by fixed increments when Q3 is positive and decreases it by fixed decrements when Q3 is negative. In this way, the length of the ON time is adjusted so as to change the switching frequency of the converter unit and thereby to return the phase delay to the target value.

Finally, a band limiter 52 (FIG. 7) receives the signal GUIDE from the master and clamps T_ON between an upper limit GUIDE+x and a lower limit GUIDE−x (see FIG. 10). This assures that the switching frequency in the slave is locked to the switching frequency of the master, so that the power conversion rate in the slave can deviate from the power conversion rate in the master only by a limited tolerance, the tolerance being large enough to give enough leeway for feedback-controlling the phase delay.

At power start-up of the converter, the controllers 22a of the slaves may start with arbitrary phase delays, but the feedback-control of the phase delays will assure that all phase delays are quickly tuned to their target values.

The invention claimed is:

1. A bidirectional power converter comprising:
   a number of flyback converter units connected in parallel, each converter unit having a controller and being adapted to accumulate power from a primary side during an ON time of the unit and to deliver the accumulated power to a secondary side during an OFF time, the primary and secondary sides being interchangeable in accordance with the direction of power conversion, each controller being configured to operate at a boundary between a discontinuous current mode and a continuous current mode and to perform valley switching when switching from OFF to ON,
   wherein one of the converter units is configured to operate as a master wherein the controller associated therewith is adapted to control the length of the ON time in order to feedback-control an overall current output of the converter, and
   wherein each of the other converter units is configured to operate as a slave wherein the controller of each of the other converter units is adapted to control the length of the ON time in order to feedback-control a phase delay of the ON time of the slave relative to the ON time of another one of the converter units,
   wherein the controllers are each configured to use the same circuit components for controlling the converter unit in two modes of operation with opposite directions of power conversion, each controller being responsive to a logic direction signal that indicates the direction of power conversion,
   wherein the controller of each slave includes a phase feedback controller comprising:
     a phase detector adapted to convert a phase delay between the master and the slave into a phase indicating voltage,
     a phase comparator for comparing the phase indicating voltage to a target value for the phase delay, and
     a circuit adapted to increase and decrease the voltage signal that represents the length of the ON time on the basis of the comparison result.

2. The power converter according to claim 1, wherein each converter unit comprises at least two electronic switches, with at least one switch on each side of a transformer of the flyback converter, and the switches are formed of SiC semiconductors.

3. The power converter according to claim 1, wherein the phase feedback controller includes a slope limiter adapted to change an analog voltage signal representing the length of the ON time with a limited time rate of change.

4. The power converter according to claim 1, wherein the controllers are configured to control the length of the ON time cycle-by-cycle.

5. The power converter according to claim 4, wherein the controllers are configured to limit the OFF time to a minimum value.

6. A power conversion system comprising:
   the bidirectional power converter according to the claim 1, connected between a first pair of DC voltage terminals and a second pair of DC voltage terminals, the bidirectional power converter having a number of transformers comprising a first winding on the side of the first DC voltage terminals and a second winding on the side of the second DC voltage terminals,
   wherein at least one of the first and second windings of each transformer is split into a number N≥2 of sub-windings, each sub-winding forms part of a converter sub-unit having a pair of input/output terminals, the input/output terminals of the sub-units are connected in series between the corresponding pair of DC voltage terminals, thereby to divide the voltage across these DC voltage terminals into N voltage fractions, and the number N is selected such that the voltages and voltage fractions, respectively, of the voltages across the first and second DC voltage terminals differ by no more than +/−20%.

7. The power conversion system according to claim 6, wherein each sub-winding has a number of turns that is equal to the number of turns of the first winding of the transformer.

8. The power conversion system according to claim 6, wherein the first pair of DC voltage terminals is connected to a battery of an electric vehicle and the second pair of DC voltage terminals is connected to a rectified grid voltage.

9. The power converter according to claim 1, wherein each controller is arranged for generating an analog voltage signal that represents a target value for the length of the ON time and includes a timer adapted to compare said analog voltage signal to a linearly increasing ramp voltage for determining a time of the end of the ON time.

10. A bidirectional power converter according to claim 6, comprising:
    a number of flyback converter units connected in parallel, each converter unit having a controller and being adapted to accumulate power from a primary side during an ON time of the unit and to deliver the accumulated power to a secondary side during an OFF time, the primary and secondary sides being interchangeable in accordance with the direction of power conversion, each controller being configured to operate at a boundary between a discontinuous current mode and a continuous current mode and to perform valley switching when switching from OFF to ON,
    wherein one of the converter units is configured to operate as a master wherein the controller associated therewith is adapted to control the length of the ON time in order to feedback-control an overall current output of the converter, and wherein each of the other converter units is configured to operate as a slave wherein the controller of each of the other converter units is adapted to control the length of the ON time in order to feedback-control a phase delay of the ON time of the slave relative to the ON time of another one of the converter units,
    wherein each controller is arranged for generating an analog voltage signal that represents a target value for the length of the ON time and includes a timer adapted to compare said analog voltage signal to a linearly increasing ramp voltage for determining a time of the end of the ON time, and wherein each slave includes a phase feedback controller which includes a band limiter adapted to limit the analog voltage signal that represents the length of the ON time of the slave to an interval with fixed width that includes the analog voltage signal that represents the length of the ON time of the master.

11. The power converter according to claim 10, wherein the controllers are each configured to use the same circuit components for controlling the converter unit in two modes of operation with opposite directions of power conversion, each controller being responsive to a logic direction signal that indicates the direction of power conversion.

12. The power converter according to claim 10, wherein each converter unit comprises at least two electronic switches, with at least one switch on each side of a transformer of the flyback converter, and the switches are formed of SiC semiconductors.

13. The power converter according to claim 10, wherein the controllers are configured to control the length of the ON time cycle-by-cycle.

14. The power converter according to claim 13, wherein the controllers are configured to limit the OFF time to a minimum value.

15. A power conversion system comprising:

the bidirectional power converter according to the claim 9, connected between a first pair of DC voltage terminals and a second pair of DC voltage terminals, the bidirectional power converter having a number of transformers comprising a first winding on the side of the first DC voltage terminals and a second winding on the side of the second DC voltage terminals, wherein at least one of the first and second windings of each transformer is split into a number $N \geq 2$ of sub-windings, each sub-winding forms part of a converter sub-unit having a pair of input/output terminals, the input/output terminals of the sub-units are connected in series between the corresponding pair of DC voltage terminals, thereby to divide the voltage across these DC voltage terminals into N voltage fractions, and the number N is selected such that the voltages and voltage fractions, respectively, of the voltages across the first and second DC voltage terminals differ by no more than $+/-20\%$.

16. The power conversion system according to claim 15, wherein each sub-winding has a number of turns that is equal to the number of turns of the first winding of the transformer.

17. The power conversion system according to claim 15, wherein the first pair of DC voltage terminals is connected to a battery of an electric vehicle and the second pair of DC voltage terminals is connected to a rectified grid voltage.

* * * * *

UNITED STATES PATENT AND TRADEMARK OFFICE
CERTIFICATE OF CORRECTION

PATENT NO. : 11,791,734 B2  
APPLICATION NO. : 17/420754  
DATED : October 17, 2023  
INVENTOR(S) : Mike Van Den Heuvel et al.

Page 1 of 1

It is certified that error appears in the above-identified patent and that said Letters Patent is hereby corrected as shown below:

On the Title Page

Item (73), change the Assignee from "Power Research Electronics B.V., Breda (NL)" to
-- Chargeco Holding B.V., ad De Waal (NL) --.

In the Claims

Column 12, Line 41, change "6" to -- 9 --.

Column 14, Line 3, change "9" to -- 10. --.

Signed and Sealed this  
Twenty-first Day of November, 2023

Katherine Kelly Vidal  
Director of the United States Patent and Trademark Office